United States Patent [19]

England et al.

[11] Patent Number: 4,531,386
[45] Date of Patent: Jul. 30, 1985

[54] FABRIC COVER FOR DAMPENER ROLLS

[75] Inventors: William T. England; Wing Y. T. Lau, both of Seneca, S.C.

[73] Assignee: The Kendall Company, Boston, Mass.

[21] Appl. No.: 500,052

[22] Filed: Jun. 1, 1983

[51] Int. Cl.³ .............................................. D04B 7/16
[52] U.S. Cl. ........................................ 66/202; 66/190
[58] Field of Search .................. 66/202, 190, 170, 194

[56] References Cited

U.S. PATENT DOCUMENTS

| 3,180,115 | 4/1965 | Marshall | 66/170 |
|---|---|---|---|
| 3,242,554 | 3/1966 | Raymond | 66/170 X |
| 3,691,796 | 9/1972 | Mayer | 66/202 |
| 3,926,701 | 12/1975 | Nishiwaki | 66/194 |
| 4,043,142 | 8/1977 | Marshall | 66/170 |
| 4,400,418 | 8/1983 | Takeda et al. | 66/194 X |

Primary Examiner—Ronald Feldbaum
Attorney, Agent, or Firm—Edward J. Scahill, Jr.

[57] ABSTRACT

An improved fabric for covering dampener rolls comprising a ground yarn, a water shrinkable inlay yarn and a hydrophilic pile yarn. The fabric is fashioned into a cylindrical tube and is securely fastened to a roll by thoroughly wetting the tubular fabric and roll in water until the water shrinkable inlay yarn shrinks causing the fabric to tighten down on the roll. When the inlay yarn of the dampener cover shrinks it does so in a widthwise or circumferential manner, thereby exerting a force upon the surface of the dampener roll similar to the force exerted by a series of rubber bands, thus securing the dampener cover to the dampener roll. This unique fabric construction also allows for a reduction in lengths of fabric needed to cover a roll, because the fabric shrinks circumferentially and not lengthwise. Thus, a cover may be measured more precisely to the length needed to cover a specific roll.

4 Claims, 3 Drawing Figures

FABRIC COVER FOR DAMPENER ROLLS

BACKGROUND OF INVENTION

This invention relates to an improved cylindrical dampener cover used on an offset printing machine for supplying water to the plate cylinder. More particularly, the invention relates to a dampener roll cover for use in an offset printing machine prepared by knitting or weaving yarns into the cover that are shrinkable by water and are used as inlay yarns, with hydrophilic yarns as pile yarns, and any natural or man made yarns as ground yarns.

Prior art dampener roll covers used to supply water to the plate cylinder were prepared by fabricating a cloth made by knitting or weaving cotton into a cylindrical shape, mounting it onto a dampener roll, and stretching it by pulling the opposite ends of the cylindrically shaped cloth before use. Difficulties encountered in this technique are that the covering fabric is apt to be loosened by centrifugal force during the rotation of the roll, causing the supply of water to the plate cylinder to become uneven due to uneven stretching of the fabric. This causes frequent interruptions of the printing operation in order to replace the covering fabric with a new cover or to try to restretch the old one. This eventually results in a reduction of the efficiency of the printing operation, adding additional costs of material and labor.

In U.S. Pat. No. 3,242,554, it is disclosed that dampener roll covers can be made from water-shrinkable fabrics. These fabrics are made into a cylindrical cover, mounted on a dampener roll and immersed in water to shrink the cover on the roll. However, these particular water-shrinkable fabrics must first be wet-stretched and dried prior to use, and they have a limited degree of stretch, and then shrink by less than the original stretching when wet. This particular covering has drawbacks, because with the limited shrinkage, the cover must be measured to the rolls on which they are to be used and the same size cover cannot be used on rolls that have been reground, as they must be because of use.

Additionally, U.S. Pat. No. 3,926,701 discloses a covering fabric for a dampener roll, which is comprised of yarn capable of shrinking by the action of water. However, the shrinkable yarns used therein are employed as the ground yarn of the covering with hydrophilic yarns used as the pile yarn. In mounting the covering fabric of this invention onto a dampener roll, the roll covered with the fabric is immersed in water, often warm water, and the ground yarns of the covering fabric shrinks to closely fix the covering fabric to the dampener roll. In addition, because shrinkage occurs on the dampener cover in the lengthwise direction, when mounting, sufficient fabric must be used in order to accommodate the lengthwise shrinkage of the dampener cover to cover the dampener roll. It is therefore difficult, if not impossible, to be able to calculate the correct length of the covering fabric that should be used. Thus, one must use an excess of material to insure an adequate fit. Because of the aforementioned, furthermore there is a loss that arises with respect to the material and man hours that may be lost due to the material that may have to be removed after shrinkage of the covered fabric to the dampener roll.

There are other additional drawbacks in using the shrinkable yarns as the ground yarn, namely, the yarns when used as the ground yarn tend to make the cover very stiff; difficult to mount on a dampener roll; harder to remove from the roll and at larger diameters can create sufficient force upon the dampener roll to cause damage to the roll.

The present invention has succeeded where others have failed in obtaining an excellent covering fabric for a dampener roll without the drawbacks encountered with either the conventional structured covers or by the prior art water-shrinkable covers.

SUMMARY OF THE INVENTION

The present invention is an improved fabric for covering dampener rolls comprising a ground yarn, a water shrinkable inlay yarn and a hydrophilic pile yarn. The fabric is fashioned into a cylindrical tube and is securely fastened to a roll by submerging the fabric and roll in water until the water shrinkable inlay yarn shrinks causing the fabric to tighten down on the roll. This unique assemblage of yarns results in the cover exerting a circumferential gripping action on the dampener roll thus securing itself better than other prior art dampener covers. The assemblage of yarns also accounts for a reduction in the amount of fabric needed to cover a roll.

An object of this invention is to provide a covering fabric that has a circumferential shrinkage and gripping action on the surface of a dampener roll.

Another object is to reduce the amount of materials used in a dampener cover.

Still another object is to provide a cover that is pliable, softer, easier to mount and easier to remove from a dampener roll.

Additionally, another object of this invention is to provide a covering fabric for a dampener roll, which may be mounted on a dampener roll by taking accurate lengthwise measurements of the roll and cutting the length of the cover accordingly, resulting in the reduction in the amount of waste fabric.

DESCRIPTION OF THE PREFERRED EMBODIMENT

The present invention provides a cover for a dampener roll prepared by circular weft knitting a water-shrinkable inlay yarn into a fabric.

Figure 1:
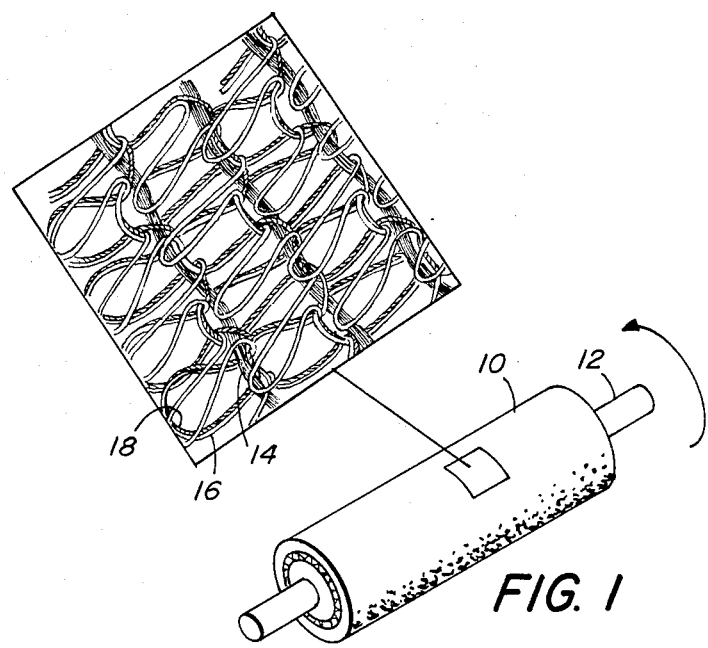
FIG. 1 shows a dampener roll with a cover made in accordance with the present invention.
Figure 2:
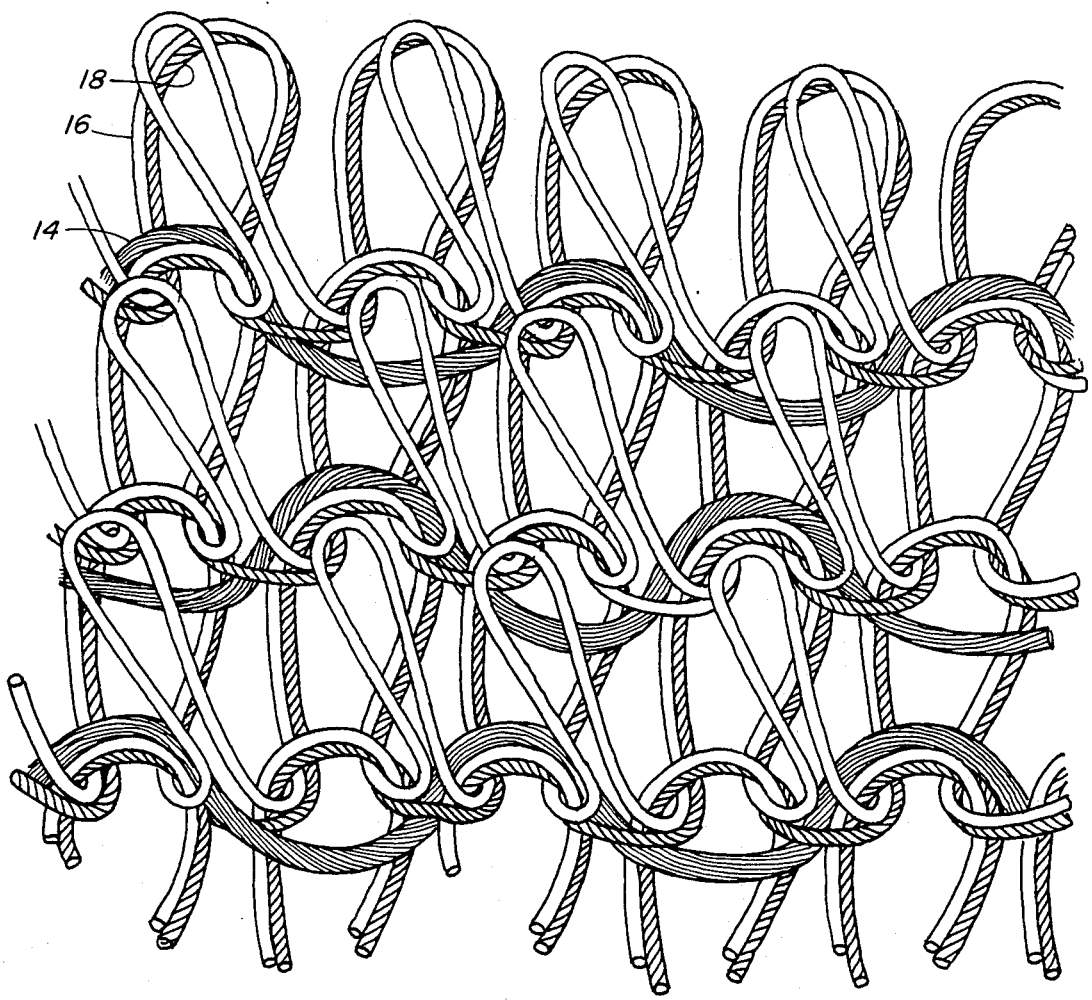
FIG. 2 shows yarns of the fabric of the present invention, before being wet.

FIG. 1 having an insert shows the cover 10 mounted on a dampener roll 12 and also shows the circumferential direction of the inlaid yarn 14 within the courses and wales of the knitted cover. The yarns used in the making of this product consist of a ground yarn 18, a pile yarn 16 and an inlay yarn 14, as shown in FIG. 2. The inlay yarn 14 must have the property of being of water-shrinkable material. The pile yarn 16 of the cylindrical cover may be selected from one or more hydrophilic yarns, for example, cotton, hemp, wool, silk, rayon and nylon or the like. Of course combinations of hydrophilic and hydrophobic yarns may be used as long as the majority of yarns used are hydrophilic. The ground yarn 18 may be any natural or man made yarn.

Figure 3:
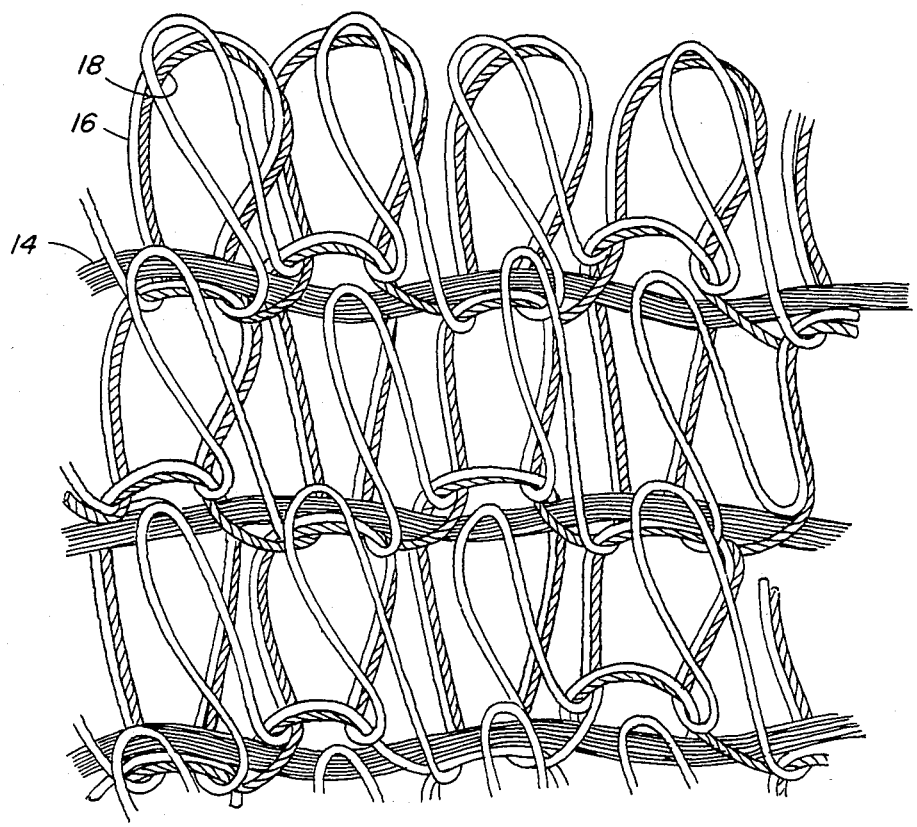
FIG. 3 shows the fabric of the present invention after being wet.

A comparison of FIGS. 2 and 3 illustrates the above, wherein a polyvinyl alcohol (PVA) multi-filament yarn made from a polyvinyl alcohol resin having the capability of shrinking in water may be used as the inlay yarn 14, which is interlaced approximately perpendicularly through the ground 18 and pile yarns 16.

FIGS. 2 and 3 also illustrate the reaction caused by submerging the dampener roll cover into water. FIG. 2 shows a section of the dampener roll cover before it is submerged in water with the inlaid yarn 14 lying in a relaxed state. FIG. 3 shows the same section as illustrated in FIG. 2 but after it has been submerged in water and the inlaid yarn 14 has reacted by shrinking in a widthwise direction causing the dampener cover to be reduced in circumference.

The procedure in assembling the cover on the dampener roll requires the cover to be positioned on the dampener roll, then the roll with the covering fabric thereon is immersed in water, usually warm water because the reaction of the yarn is greater under these conditions, whereupon the inlay yarns of the covering fabric shrink in a widthwise or circumferential direction to fix the cover to the roll.

Because the shrinkage occurs predominantly in the widthwise or circumferential direction, it is not necessary to add additional length of fabric to the cover prior to mounting on the dampener roll in order to compensate for shrinkage in the lengthwise direction, such as is exhibited by prior art covers. Therefore, since more precise measurements can be used in making the cover, significant savings in raw material costs are possible. It has unexpectedly been found that there are many advantages of using a shrinkable yarn as the inlay yarn. Some of the advantages include: less PVA yarn has to be used, therefore reducing the cost of material; the using of less PVA yarn results in a cover that is soft and more pliable; because the cover is softer and more pliable it facilitates the mounting and removal of the cover from the dampener roll; the overall force exerted by the cover on the roll is greatly reduced, therefore allowing longer life of the roll; and the quality of printing is further enhanced. Additionally, the cover may be cut to a predetermined length to fit a dampener roll and when shrinkage occurs the cover will shrink not only to fit the fabric onto the surface of the roll but the fabric will shrink at the ends of the roll whereby necking in around the edge of the roll takes place, further securing the cover in position on the roll.

To realize the aforementioned advantages the shrinkable yarns used are usually yarns of polyvinyl alcohol which generally have a shrinkage percentage between 25–40%. Although PVA yarns are preferred, other yarns which have typically high shrinkage may be used with similar although somewhat less desirable results; for example, special polyester, nylon, rayon.

The following is a typical example illustrative of the preferred embodiment of this invention. It should be realized that the present invention should not be limited to this example.

EXAMPLE

A cylindrical fabric was prepared by knitting polyvinyl alcohol yarns such as those made by the Nitivy Company which is a 675 denier Solvron polyvinyl alcohol yarn, as the inlaid yarn, 150 denier white and 300 denier red Celletex rayon yarn made by the Rhoue-Poulenc Company, as the pile yarn; and, 70 denier nylon as the ground yarn.

A sample was taken from this knitted fabric, with the sample having a width of 4.625 inches and a length of 6.0 inches. The width and length of this sample were measured and recorded. All measurements for the following experiment were taken while the fabric was in a limp state with no outside forces being applied. An experiment was then conducted, whereby the sample was immersed. in 120° Fahrenheit tap water for a period of five minutes. After this period the sample was removed and immediately measured. The width was recorded at 4.0625 inches or a reduction in width of 12.2% from the original width. The length was also measured and recorded at 6.0 inches or a reduction of 0% from the original length. This sample was composed of 16.6% (by weight) polyvinyl alcohol yarn, 80.9% of rayon yarn and 2.5% of nylon yarn and had a gram weight of approximately 54.1 grams per foot.

In order to compare prior art fabric to the present fabric an additional experiment was conducted using a sample of a prior art fabric, whereby the polyvinyl alcohol yarn (Solvron 675 denier PVA yarn) was the ground yarn and the 150 denier white and 300 denier red Celletex rayon was used as the pile yarn. The following is the results of the experiment using a sample of a prior art fabric. A sample of fabric was taken being careful to use the same machine setup as in the experiment with the present invention. An original width of 3.750 inches and length of 6.0 inches. All measurements for the experiment were taken while the fabric was in a limp state with no outside forces being applied. The same procedure as in the previous experiment was followed whereby the sample was immersed in 120° Fahrenheit tap water for a duration of five minutes whereupon it was removed. The sample was immediately measured. The width of this fabric was recorded at 3.5 inches which is a 6.7 percent reduction in the width whereas the measurement on the length showed a reduction to 5.0 inches, or a decrease in length of 16.7%. This sample was composed of 28.8% (by weight) polyvinyl alcohol yarn and 71.2% rayon yarn and had a gram weight of 51.2 grams per foot.

The aforementioned illustrate the differences between the two fabrics. These differences are important. The prior art fabric shrinks in the lengthwise direction, therefore needing additional length in the fabric to accommodate this shrinkage, otherwise the fabric may not be long enough to cover the ends of the dampener roll. This extra fabric has to be removed, therefore waste results. Such additional fabric is not needed in the fabric of the present invention. Because of its widthwise shrinkage, it may be accurately measured in the lengthwise direction leaving no waste material. The prior art cover uses 12.2 percent more PVA yarn fiber than the present invention, thus causing it to be stiff, difficult to mount and because of the shrinkage of this PVA fiber in the lengthwise direction, sufficient force can be created on the dampener roll to damage it.

It is intended that this invention be limited only by the following claims:

What is claimed is:

1. In a circular weft knitted water shrinkable dampener roll cover fabric having wales and courses, the improvement comprising a ground yarn; a pile yarn; and a water shrinkable yarn inlaid in every course, said courses running circumferentially in said cover fabric, said wales running length-wise in said cover fabric, said cover fabric exhibiting a substantially circumferential shrinkage after immersion in water.

2. The dampener roll cover of claim 1 wherein said water shrinkable yarn is a polyvinyl alcohol fiber having shrinkage percentage of between 25% to 40%.

3. The dampener roll cover of claim 1 wherein said pile yarns are hydrophilic.

4. The dampener roll cover of claim 2 wherein said cover undergoes a predominantly circumferential shrinkage after immersion in water, said circumferential shrinkage is at least 15% to 25%.

* * * * *